United States Patent
Franklin et al.

(10) Patent No.: US 6,274,854 B1
(45) Date of Patent: *Aug. 14, 2001

(54) METHOD AND APPARATUS FOR BAKING OUT A GATE VALVE IN A SEMICONDUCTOR PROCESSING SYSTEM

(75) Inventors: Timothy Joseph Franklin, San Jose; David Datong Huo, Palo Alto, both of CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/371,804

(22) Filed: Aug. 10, 1999

Related U.S. Application Data

(62) Division of application No. 08/635,094, filed on Apr. 17, 1996.

(51) Int. Cl.[7] .................................................. H05B 3/02
(52) U.S. Cl. .......................... 219/546; 219/201; 137/341
(58) Field of Search ..................... 219/546, 540, 219/201, 535, 464; 137/337, 341; 392/468; 432/6, 224, 225

(56) References Cited

U.S. PATENT DOCUMENTS

| | | |
|---|---|---|
| 1,706,997 | 3/1929 | Davis, Jr. . |
| 1,748,510 | 2/1930 | Forman . |
| 1,952,589 | 3/1934 | Guenst . |
| 1,991,801 | 2/1935 | Greenfield . |
| 2,608,996 | 9/1952 | Forman . |
| 2,646,065 | 7/1953 | Tyson . |
| 2,739,221 | 3/1956 | Morey . |
| 3,055,055 | 9/1962 | Cook et al. . |
| 3,158,363 | 11/1964 | Breckenridge . |
| 3,349,722 | 10/1967 | Davis . |
| 3,398,262 | 8/1968 | Kahn . |
| 3,605,795 | 9/1971 | Rajakovics . |
| 3,633,891 | 1/1972 | Heran . |
| 3,679,189 | 7/1972 | Deal et al. . |
| 3,733,459 | 5/1973 | Lengstorf . |
| 3,747,892 | 7/1973 | Gigantino et al. . |
| 4,152,577 | 5/1979 | Leavines . |
| 4,726,394 | 2/1988 | Devine . |
| 4,830,611 | 5/1989 | Guntermann et al. . |
| 4,900,247 | 2/1990 | Takahashi . |
| 4,986,213 | * 1/1991 | Yamazaki et al. ................... 118/719 |
| 5,413,139 | 5/1995 | Kusumoto et al. . |
| 5,462,080 | 10/1995 | Plavidal et al. . |

FOREIGN PATENT DOCUMENTS

| | | |
|---|---|---|
| 9205235 U | 6/1992 | (DE) . |
| 0272363 | 3/1987 | (EP) . |
| 0640784 | 7/1994 | (EP) . |
| 2418600 | 9/1979 | (FR) . |
| 4064788 | 2/1992 | (JP) . |

OTHER PUBLICATIONS

VacuComp™ Series 43 Heated Pumping Lines Brochure, HPS Division of MKS Instruments, Inc., Apr. 1994.

VAT Catalog, in particular, pp 44–51, published prior to filing date of the present application.

Page entitled "Technical Data" for EXOBLOC BF–1000 Silicone Foam, published prior to the filing date of the present application.

Page entitled "Heater Insulation" published prior to the filing date of the present application.

European Search Report dated Apr. 8, 1998 in Application No. 97302630.

* cited by examiner

*Primary Examiner*—Teresa Walberg
*Assistant Examiner*—Quang Van
(74) *Attorney, Agent, or Firm*—Konrad, Raynes & Victor, LLP

(57) ABSTRACT

A device for achieving vacuum conditions more quickly in a semiconductor processing system having a vacuum pump, a gate valve and a chamber includes a rigid body containing heating elements that contact the surface of the gate valve. The device may include a U-shaped retainer clip for holding the device to the gate valve. A method for heating a gate valve to drive off contaminants involves heating the lower portion of the gate valve to drive contaminants towards the vacuum pump.

40 Claims, 10 Drawing Sheets

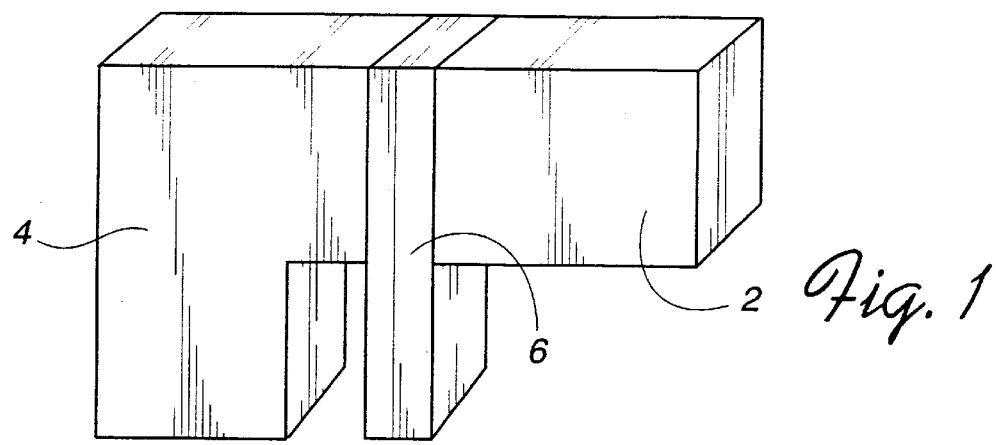
Fig. 1
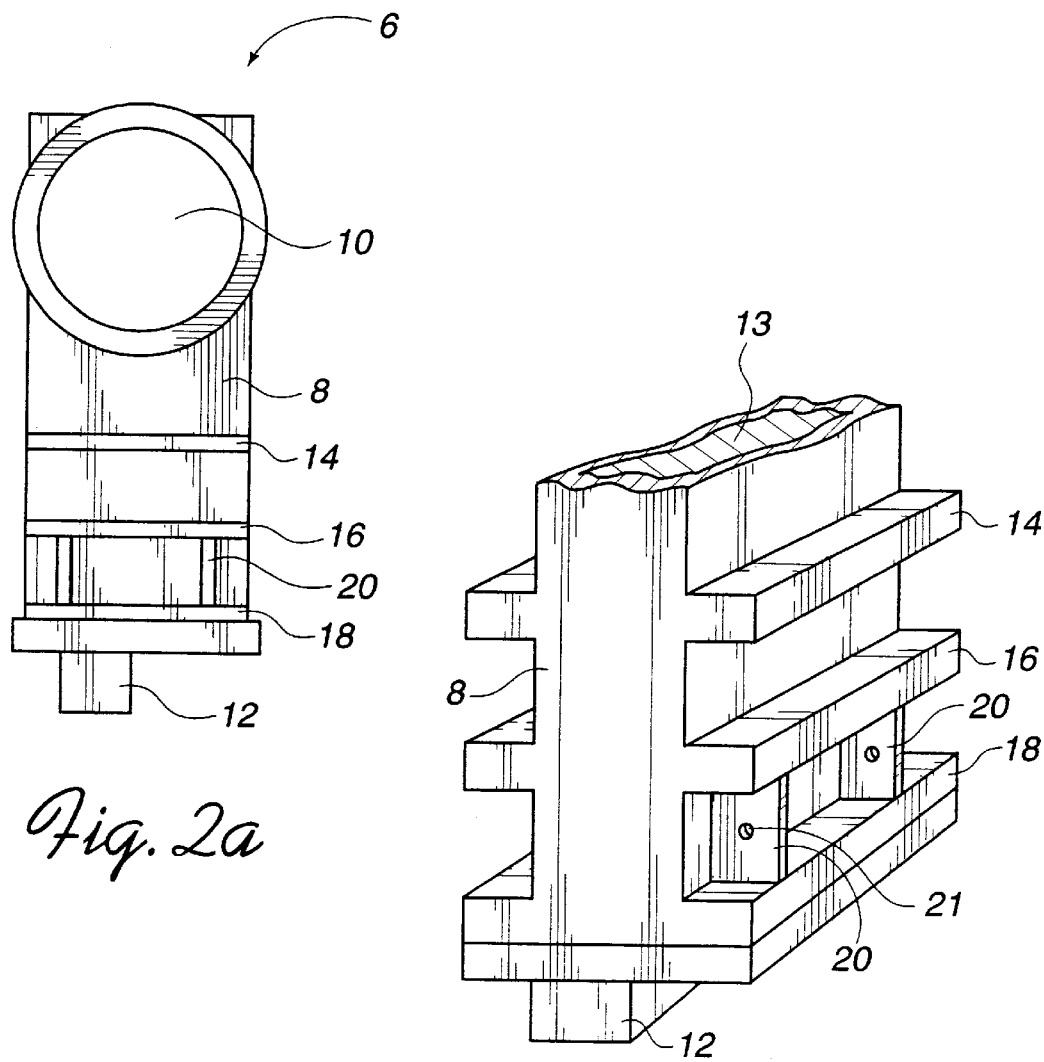
Fig. 2a
Fig. 2b

METHOD AND APPARATUS FOR BAKING OUT A GATE VALVE IN A SEMICONDUCTOR PROCESSING SYSTEM

This is a divisional of application Ser. No. 08/635,094 filed on Apr. 17, 1996.

FIELD OF THE INVENTION

This invention relates generally to semiconductor processing systems and more particularly to gate valve bake out devices and methods for more quickly achieving low pressure conditions in a vacuum chamber, in particular a semiconductor processing chamber.

BACKGROUND OF THE INVENTION

The adherence of a film layer to a substrate such as a panel, a semiconductor wafer or other workpiece during a deposition process depends to a great extent on the cleanliness of the workpiece surface prior to deposition. Many semiconductor processes such as physical vapor deposition (PVD) rely on ultra high vacuum (UHV) chambers for the most favorable processing conditions and performance. An ultra high vacuum delays the growth of contaminating films on the wafer surface prior to deposition, because materials, such as oxygen, which react with, or deposit on, the substrate to form contamination films, are present in very small quantities in an UHV. In general, a UHV chamber used for PVD should operate at pressures of lower than about $10^{-8}$ torr. A cryogenic pump (cryo-pump) may be utilized in order to achieve such low pressures. A PVD system may employ more than one vacuum pump, for example, a roughing pump for achieving about $10^{-2}$ torr and a cryo-pump for achieving lower pressures. One such cryo-pump useful for achieving high vacuum is manufactured by CTI Cryogenics.

Between the chamber and the cryo-pump is typically provided a gate valve having a passage coupling the chamber to the cryo-pump. The passage in the gate valve may be opened and closed in order to open or close off the cryo-pump from the chamber. Such a gate valve is manufactured, for example, by VAT Incorporated, of Woburn, Mass.

When a vacuum chamber is first pumped to vacuum, such as after it has been opened or cleaned, materials which have adhered on or in the vacuum chamber surfaces can detach therefrom as vacuum is achieved. In many cases, these materials, one being water vapor, will generally continuously leak into the chamber and thereby make it difficult or impossible for the chamber to achieve UHV. Therefore, a bake out step may also be utilized in which the reaction chamber is heated and contaminates are desorbed or evaporated from the chamber surfaces by the heating and then pumped out of the chamber.

Contaminants may accumulate due to a variety of causes, including (1) deposition processes; (2) replacement of the process kit (target and shield) or other consumables; (3) parts wearing out; and (4) anytime the chamber is vented to the atmosphere and contaminants enter the system. It is desirable to prevent the accumulation of such contaminants in order to reduce pump down time and to increase the yield during processing.

Chamber pump down and initial bake out to remove contaminants prior to semiconductor wafer processing are time consuming steps. Prior to commercial use, PVD systems are often qualified to ensure that the system can achieve the necessary vacuum conditions for wafer processing. Qualification is typically accomplished by baking out and pumping down the chamber to establish that proper vacuum conditions can be achieved. Furthermore, any time the chamber is vented and exposed to atmosphere, the chamber may be baked out. The chamber bake out time and the pump down time are affected by various factors, including the pumping speed and efficiency of the cryo-pump, the surface area available for gas flow into the port of the cryo-pump, the quantity of contaminants in the chamber and the release rate of the contaminants from the interior surfaces of the chamber.

The chamber may have internal heating elements for use during the bake out step. In addition to internal heaters for chambers, there also exist flexible external heating jackets that may be wrapped around external components such as inlet pipes to the chamber in order to bake out and prevent accumulation of contaminants. Such flexible heating jackets typically have a flexible heating pad that is wrapped around the outside surface of a component. Flexible heating jackets are manufactured by HPS Division of MKS Instruments, Inc.

Flexible heating jackets are generally designed for products with rounded surfaces or surfaces that are smooth, so that the entire surface of the device can be covered by the jacket. Thus, heating jackets are typically used for wrapping around relatively small parts such as rounded pipes and fittings. Large components may be difficult to adequately heat using a heating jacket, due to the large volume that must be heated and the heat loss through the jacket itself. Furthermore, flexible heating jackets may present a hazard to the user due to elevated temperatures on the jacket surface.

In addition, flexible heating jackets have a relatively short expected lifetime and can wear out during repeated use. Components for use on a PVD system should be designed to minimize the chance that particles will flake off and contaminate the system. As a flexible heating jacket wears out, the risk of particle flake-off and system contamination will increase.

Despite the use of these known internal and external heaters, bake out and pump down typically remain very time consuming. As a result, processing is delayed and the overall productivity of the processing machines is reduced.

SUMMARY OF THE INVENTION

It is an object of the present invention to provide an improved heater for semiconductor processing equipment which obviates, for practical purposes, the above mentioned limitations, particularly in a manner requiring a relatively uncomplicated electro-mechanical arrangement.

One embodiment of the present invention provides for a gate valve bake out device having at least one external rigid body portion having a heating element therein. The heating element is coupled to a contact surface which is placed into contact with an external surface of the gate valve.

Such an arrangement has been found to substantially reduce pump down time and yet avoid the need to redesign the gate valve components disposed between the reaction chamber and the cryogenic pump. In addition, the gate valve heater resists particle flaking and is easy to install and utilize.

As explained in greater detail below, applicants have recognized that contaminants accumulating throughout the interior portion of the gate valve are a significant cause of long bake out and pump down times. Applicants have discovered that by heating the gate valve to drive off the accumulated contaminants, the bake out and pump down times may be substantially reduced.

In the illustrated embodiments of the present invention, the gate valve heater includes a plurality of heated plates in contact with the gate valve and two rigid outer shells sized to accommodate ribs in the structure of the gate valve.

In another aspect, embodiments of the present invention relate to a method for removing contaminants from a semiconductor processing system having a vacuum pump, a gate valve and a chamber. Embodiments of the method include heating a portion of the gate valve to drive contaminants towards the vacuum pump, without significantly affecting the vacuum pump performance.

BRIEF DESCRIPTION OF THE DRAWINGS

Further objects, features and advantages of the invention will become apparent from the detailed description, below, when read in conjunction with the accompanying drawings in which:

FIG. 1 is a schematic diagram illustrating the relative locations of a cryogenic pump, a gate valve and a chamber in a PVD system.

FIG. 2a is a end view of a gate valve.

FIG. 2b is a perspective view of the lower body portion of the gate valve of FIG. 2a.

DETAILED DESCRIPTION OF PREFERRED EMBODIMENTS

Figure 3:
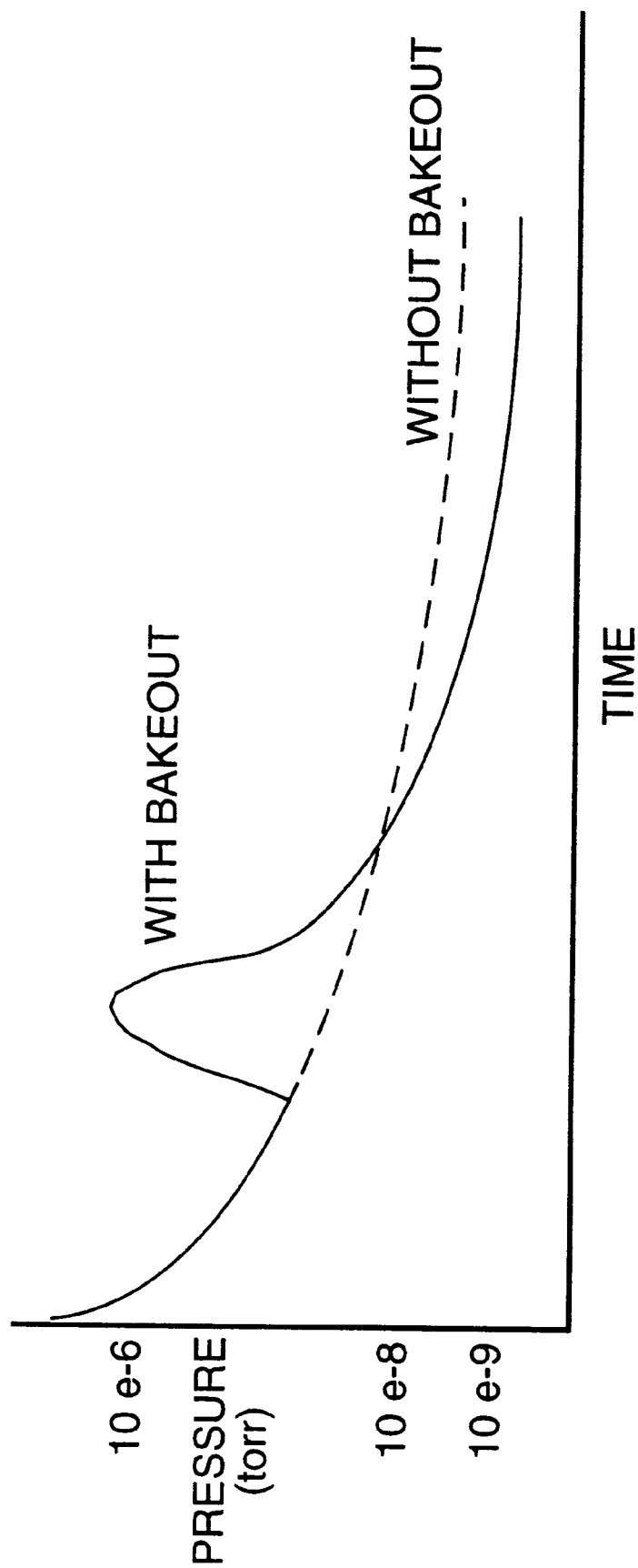
FIG. 3 is a graph of pressure versus time for processes with and without a bake out step.

The following description is made for the purpose of illustrating the principles of the invention and should not be taken in a limiting sense. The application of embodiments of the present invention to a PVD system for semiconductor processing is described in detail below. However, the principles of invention are applicable to other semiconductor processing systems as well. The scope of the invention should be determined by reference to the appended claims. It will be apparent that for clarity, dimensions are not shown to scale in the drawings.

A semiconductor processing system may include components for performing plasma vapor deposition, which, as shown in FIG. 1, includes a processing chamber 2 for preparing semiconductor wafers, a cryogenic vacuum pump 4 for achieving low pressures and a gate valve 6 disposed between the chamber 2 and cryo-pump 4. The gate valve 6 functions to open or close the chamber 2 to the cryo-pump 4.

Applicants have invented a device and method for heating the gate valve to drive contaminants from the gate valve to the vacuum pump so that the system can achieve low pressures more rapidly than if the device and method are not used. As explained below, embodiments of the device include a solid housing with thermally conductive contact plates which are placed into contact with a portion of the gate valve. Such embodiments are durable and consistent over many cycles of heating and cooling, are resistant to contaminating the system, and are easy to install and utilize. Embodiments of the method include heating the lower portion of the gate valve so as drive contaminants towards the vacuum pump without causing an adverse effect on vacuum pump performance due to the elevated temperature.

A schematic design of a gate valve 6 is shown in FIGS. 2a and 2b. The gate valve 6 includes a body portion 8 and a passage 10, the passage 10 (FIG. 2b) being aligned between a vacuum pump and a processing chamber. The gate valve 6 includes plates (not shown) disposed within a slot 13 in the gate valve body portion 8 (FIG. 2b), which intersects with the passage 10 and which may be raised and lowered by a controller 12 in order to selectively block all or a portion of the passage 10 and thereby limit or prevent communication between the process chamber and cryopump. The gate valve 6 may also have horizontal ribs 14, 16 and 18 and vertical ribs 20 built into, and extending from, the body portion for added rigidity and strength.

The gate valve passage 10 (FIG. 2a) may be fully opened or partially opened during operation of the cryo-pump and pump down of the chamber, depending on the pumping conditions needed. The amount the gate valve is opened can regulate the pumping speed. To prevent damage to the cryo-pump, the gate valve passage 10 is typically closed during the venting of the chamber. The gate valve passage 10 is also closed during the regeneration of the cryo-pump to prevent contaminants released from the pump surfaces during regeneration from entering the chamber.

During the regeneration of the cryo-pump, the pump is warmed and accumulated contaminants and water molecules are released therefrom. These contaminants travel towards the gate valve and the chamber, and settle on cool surfaces of the gate valve. Similarly, whenever the chamber is vented or exposed to atmosphere, contaminants may enter the gate valve. The gate valve has a significant interior surface area available for condensation and accumulation of contaminants. When utilizing a VAT Series 10 gate valve, size DN200 (having a passage diameter of 200 mm), the surface area of the internal walls of the gate valve and the plates used to block the passage between the chamber and the cryo-pump may be approximately ⅓ of the total surface area exposed to vacuum during wafer processing.

The chamber may contain built-in heating elements or lamps designed to bake out the interior of the chamber to drive off the accumulated contaminants. Typical bake out temperatures in the chamber may range from about 100° C. to about 200° C.

The bake out process enables low pressures to be reached in the chamber more rapidly than if no bake out process is performed. For example, the graph in FIG. 3 compares the chamber pressure versus time for a pump down process utilizing a bake out procedure and a pump down process not utilizing a bake out procedure. As seen in the FIG. 3, there is a short time of increased pressure using bake out, presumably when certain contaminants are volatized off the surfaces in the chamber. After this short time, the bake out enables the pressure to decrease more rapidly than without the bake out.

Figure 4:
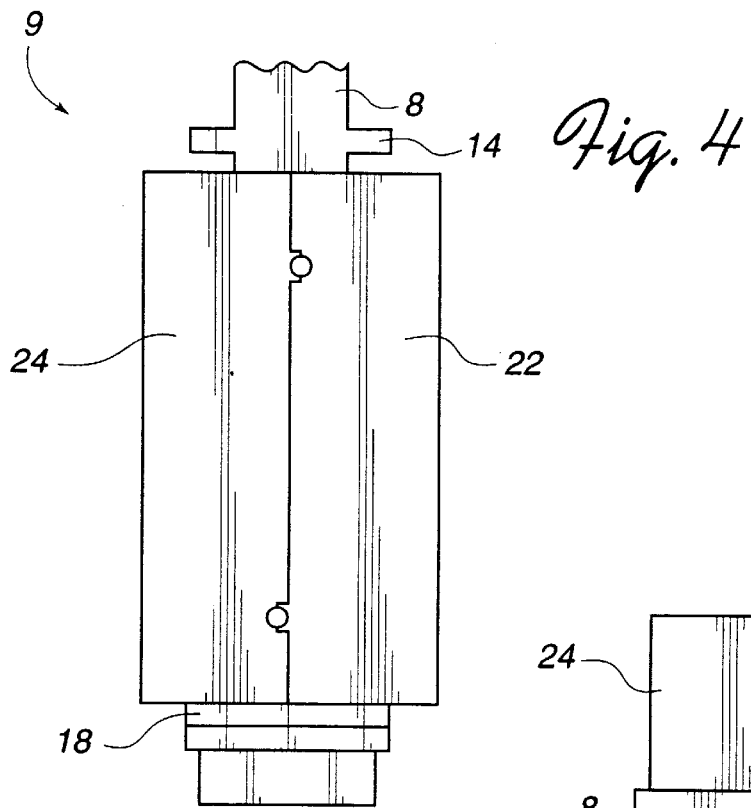
FIG. 4 is a front view of a gate valve heater in accordance with one embodiment of the present invention, disposed on the lower body portion of a gate valve.

Applicants have provided a heater for the gate valve, which is designed to drive off contaminants from the gate valve in an efficient manner so that the bake out and pump down times can be significantly reduced. In one embodiment, the gate valve heater 9 is placed over the lower part of the body portion 8 of the gate valve as shown in FIG. 4 and includes two separate sections or body portions 22 and 24 which may be connected around a portion of the gate valve. The gate valve heater 9 of the embodiment shown in FIG. 4 is designed to be received between ribs 14 and 18 and over ribs 16 and 20 (shown in FIG. 2b).

Figure 5:
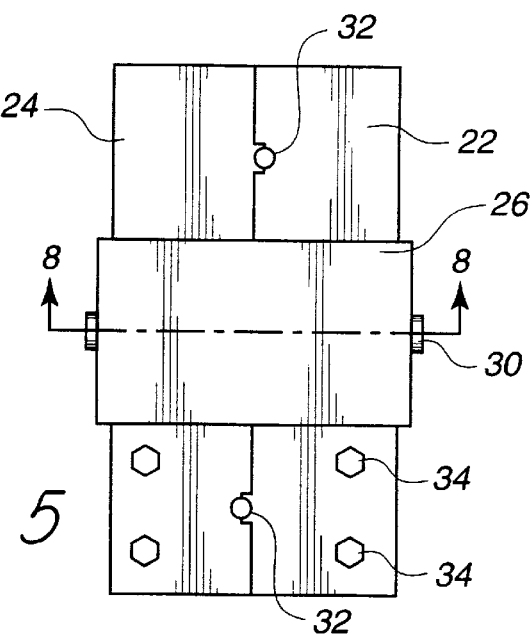
FIG. 5 is a front view of a gate valve heater of FIG. 4.
Figure 6:
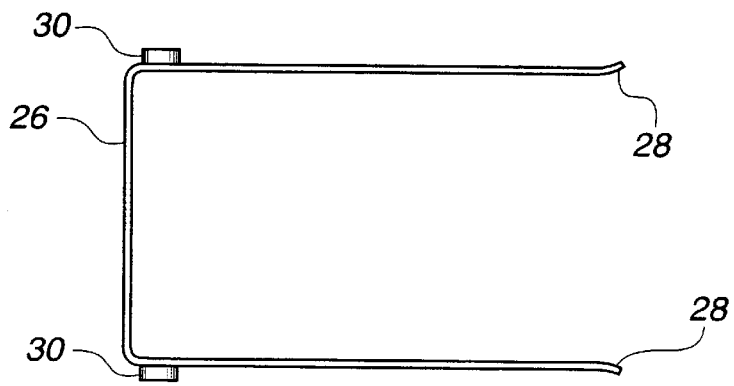
FIG. 6 is a top view of a retainer clip used in conjunction with the embodiment shown in FIG. 5.

FIG. 5 provides a more detailed end view of the front end of the gate valve heater embodiment shown in FIG. 4. A retainer clip 26 may be utilized to hold the sections 22 and 24 firmly around the gate valve. As best seen in the top view shown in FIG. 6, the retainer clip 26 may be substantially U-shaped when extended around three sides of the gate valve heater. Ends 28 of the retainer clip are slightly flared away from the gate valve heater to facilitate placing it over the sections 22 and 24. The retainer clip 26 may also have handle grip portions 30 for easier installation and for safety reasons, because the handle portions will be cooler to the touch than the outer walls of sections 22 and 24.

The retainer clip 26 may be made from a material such as a heat treated stainless steel or spring steel that is somewhat flexible and has a high elasticity. The retainer clip 26 is designed to have a memory after it is flexed so that upon application to the heater it will apply a continuous force to the outer sides of the heater body and ensure contact between the gate valve heater and the surface of the gate valve.

FIG. 5 also illustrates the location of adjustment screws 32, which, as explained later herein, are used to align the position of the heater on the gate valve. Input and output lines 34 are present for functions such as power supply and temperature output. Strain relief lines (for example, a rubber boot on the wires) may be used to increase safety.

Figure 7:
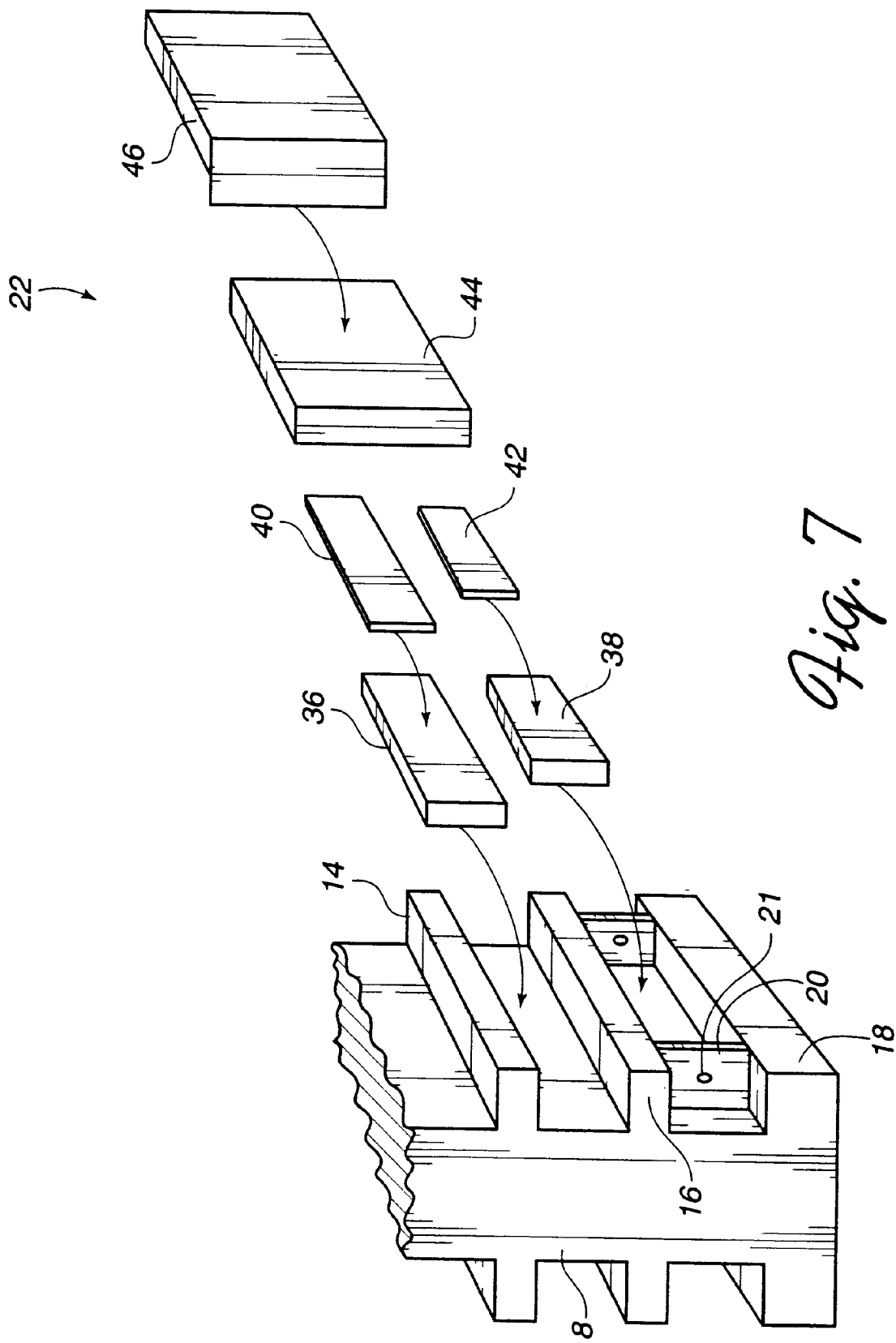
FIG. 7 is a exploded view of a section of the gate valve heater of FIG. 5.

Major components of section 22 of the gate valve heater of the illustrated embodiment and the position of the components relative to the gate valve, can be seen in the exploded view of FIG. 7. (The other section 24 (not shown) is constructed in a similar fashion.) These components include rigid upper and lower contact plates 36 and 38, having flat contact surfaces which are placed into direct contact with the corresponding flat outer surfaces of the gate valve body 8. Upper and lower heating elements 40 and 42 are connected to the upper and lower contact plates 36 and 38, respectively, so that the heat is transferred from the heating elements to the contact plates. In order to increase the efficiency of the heater and to protect the user from being burned by contact with the heater, a significant portion of the interior volume of the gate valve heater is filled with insulation material 44. The insulation 44 is disposed between the heating elements and an outer shell or cover 46.

The outer shell 46 of the gate valve heater may be fabricated from a metal such as stainless steel. The shell 46 preferably has a box-like shape to provide a degree of stiffness or rigidity to each section 22 or 24 of the gate valve heater so that the sections 22 and 24 may be held in place by the retainer clip 26. Depending on the tolerable heat level on the outer shell of the gate valve heater, the amount of insulation may be varied. In certain preferred embodiments, the insulation 44 covers all or nearly all of the interior surfaces of the outer shell 46 of the heater. The insulation 44 may also engage portions of the gate valve such as the ribs 16 and 20 and help to insure properly positioning of the heater on the gate valve.

The insulation 44 should be fabricated from a material that is unlikely to flake off or shed into particles during use. Furthermore, the insulation 44 should preferably be selected so as to minimize the heat transfer to the outer shell 46, to reduce the risk of injury to the user. A preferred material for the insulation 44 is EXOBLOCK® BF-1000 Silicone Foam, manufactured by Bisco Products, a Dow Corning subsidiary. The EXOBLOCK® BF-1000 insulation material may include an adhesive on one surface, which can be utilized to attach the insulation 44 to the inside surface of the cover 46.

The contact plates 36 and 38 may be fabricated from a variety of materials that have a high thermal conductivity, so that thermal energy will be efficiently transmitted to the gate valve. A preferred material is aluminum. Suitably sized heating elements 40 and 42 are placed into contact with the contact plates 36 and 38. A preferred heating element is a resistive metal wire embedded in a silicone pad such as that manufactured by Minco Products, Inc. Such a heating element may include an adhesive on one surface for attaching the heating element to a contact plate.

It has been found that the heating elements 40 and 42 and contact plates 36 and 38 do not need to extend over the ribs in order to adequately heat the gate valve. As shown in FIG. 7, the lower contact plate 38 and heating element 42 of the illustrated embodiment are smaller than the upper contact plate 36 and heating element 40. Such an arrangement accommodates the presence of the vertical ribs 20 in the gate valve. The upper contact plate 36 and heating element 40 can be larger than the lower contact plate 38 and heating element 42 because there are no vertical ribs between the horizontal ribs 14 and 16 in the illustrated gate valve. The space between the upper contact plate 36 and lower contact plate 38 permits the horizontal rib 16 to fit between these plates within the gate valve heater body.

Figure 8:
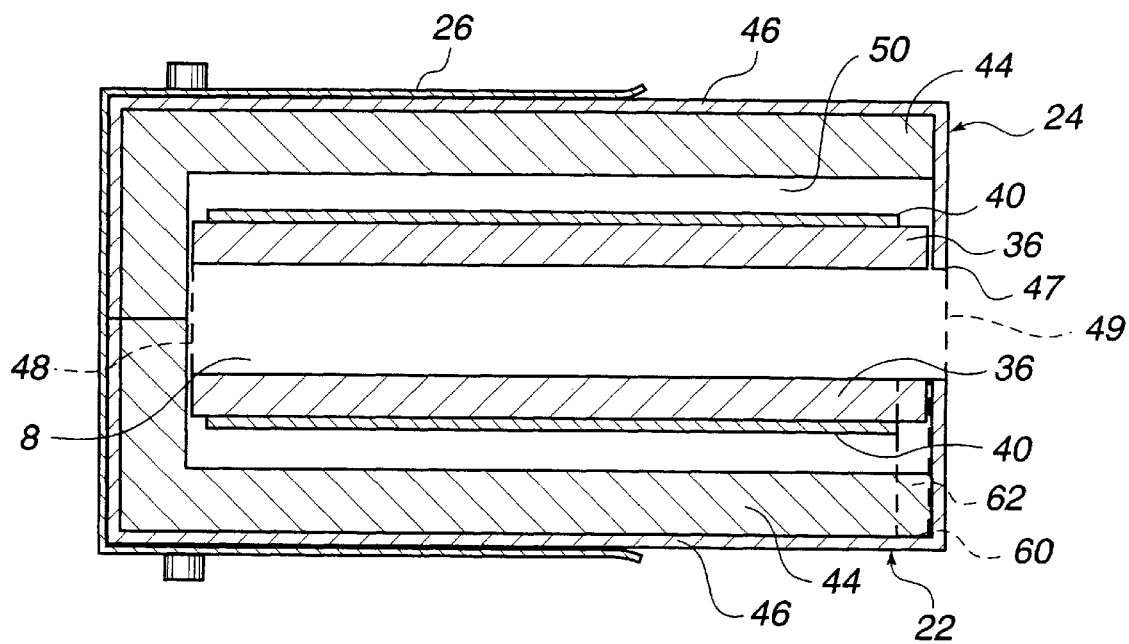
FIG. 8 is a cross-sectional view of the gate valve heater of FIG. 5 as viewed along the lines 8—8'.

A top cross-sectional view along the lines 8—8' of the gate valve heater of FIG. 5 is shown in FIG. 8. The position of the gate valve body portion 8 within the gate valve heater is presented in phantom, including front side 48 and rear side 49.

The outer shell 46 of each section 22, 24 of the gate valve heater may extend beyond the front edge 48 of the gate valve in order to provide space for input and output wiring and insulation around the ends of the gate valve. Between the insulation 44 and the heating element 40 is preferably provided a gap 50 so that the insulation 44 is not in direct contact with the heating element 40, and also provides a space for additional components such a thermocouple to be mounted. Such an arrangement also facilitates a distribution of heat transfer throughout the gap 50 by convection.

The upper heating element 40 of each section 22, 24 is attached to the upper contact block 36, which, in turn, is positioned against the surface of the gate valve. The contact blocks 36 and 38 (38 is not shown in FIG. 8) may attached to the outer shell 46 of each section 22, 24 using a variety of fasteners, for example, a bolt 60 (shown in phantom) together with a bushing spacer 62 (also shown in phantom) to rigidly support the contact block 36, 38 on a section 22, 24 and to provide a predetermined spacing between the outer shell 46 of each section 22, 24 and the contact blocks 36, 38.

In certain embodiments two bolts and bushing spacers may be used to attach each contact block to the outer shell. For safety purposes, embodiments such as the one shown in FIG. 8 may utilize bolts 60 that are spot welded or otherwise attached to the inner surface of the outer shell 46. Other fasteners, for example, a prim bolt countersunk into the outer shell 46, may be attached to the inner surface of the outer shell 46, so that there is no direct contact from the contact block to the outer surface of the outer shell 46. Bolts extending through the outer surface of the outer shell 46 may also be utilized, but internally attached bolts can reduce direct heat flow from the contact blocks 36 and 38 through the fastener to the outer surface of the outer shell 46, to protect the user.

In certain embodiments, the gate valve heater does not extend around the entire periphery of the gate valve. Depending on the temperatures utilized and the wall thickness of the gate valve, extending the heater so that it completely encircles the gate valve may be avoided because the heat loss through the back wall portion of the gate valve may be minimal. In the embodiment shown in FIG. 8, the rear end 47 of the gate valve heater does not extend across one side 49 of the gate valve body.

Figure 9:
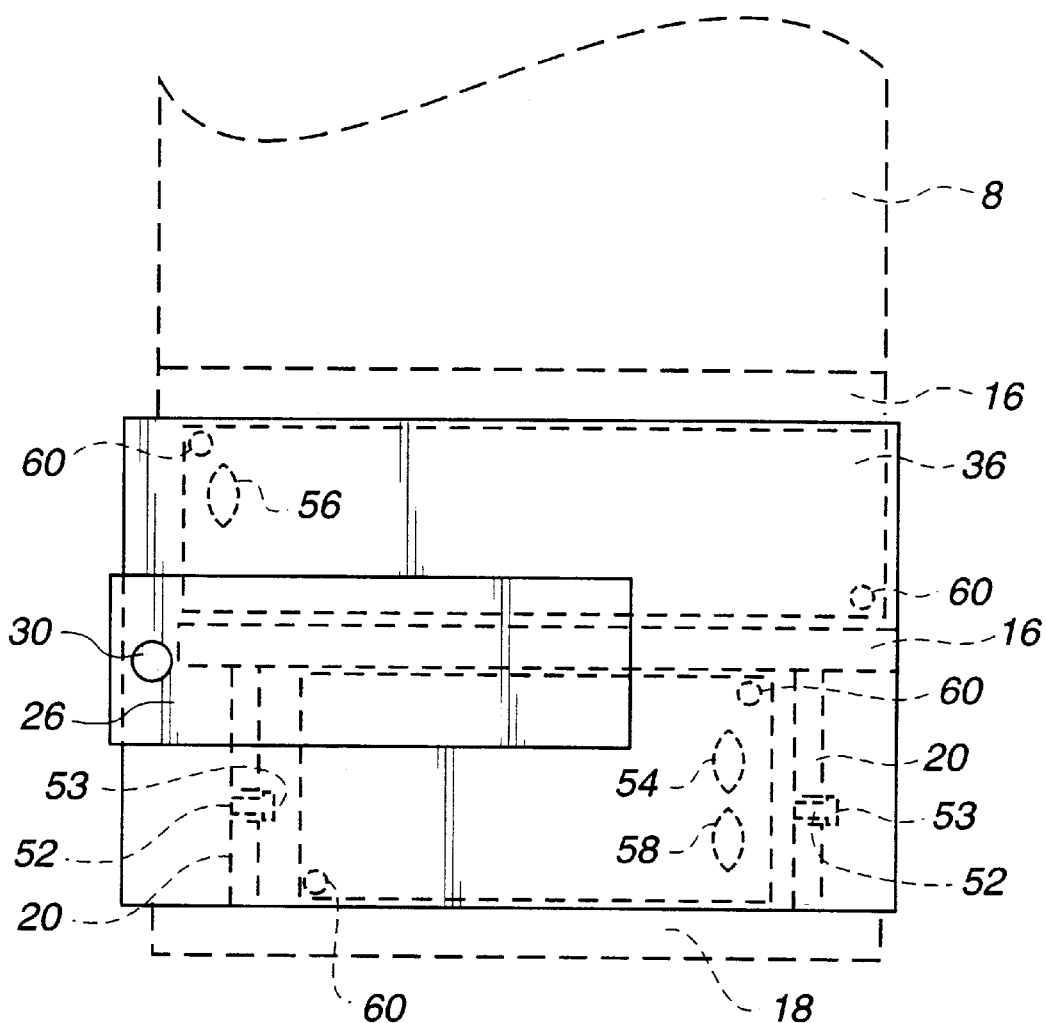
FIG. 9 is a side view of the gate valve heater of FIG. 8.

A side view of one section of the gate valve heater embodiment of FIG. 8 is shown in FIG. 9. The locations of the upper and lower contact plates 36 and 38 within the gate valve heater are indicated in phantom. The size, shape and position of the plates may preferably conform to the outlines of the gate valve body. As previously described above in connection with FIGS. 2a and 2b, the gate valve may have both vertical and horizontal ribs. The gate valve heater, as shown in FIG. 9, permits the horizontal rib 16 and vertical ribs 20 (shown in phantom) to be received within the outer shell 46 and between the spaced plates 36 and 38.

The gate valve heater may also include support posts 52 as shown in phantom in FIG. 9, which are preferably attached to each of the outer shells of the gate valve heater through support member 53. Each section 22, 24 of the gate valve heater may contain two support members 53 having support posts 52 extending therefrom (FIG. 9). Each heater section 22, 24 is placed over a portion of the gate valve body 8 and the support posts 52 are inserted into openings 21 (see FIG. 2b) incorporated into the vertical ribs 20 of the gate valve body 8 in order to support the gate valve heater in the proper position on the gate valve. The gate valve heater support posts 52 are placed into the openings 21 of the gate valve ribs 20 and forced therein until support member 53 contacts the rib 20 of the gate valve.

As explained in greater detail below in connection with FIG. 11, the gate valve heater is tightly positioned on the gate valve by turning the adjustment screws 32 (FIG. 5). First, the adjustment screws 32 may be positioned with the tip end in contact with the gate valve body. Then, further tightening of the adjustment screws 32 applies a force to the gate valve heater that pushes the support members 53 into tight contact with the vertical ribs 20.

Retainer clip 26 may be placed onto the gate valve heater sections 22 and 24 in order to apply a force through the sections and to the contact plates 36, 40. This force insures an adequate contact is made with the gate valve surface. The retainer clip 26 may be held in position on the outer shell 46 of each section 22, 24 by its frictional grip on the two sections 22, 24 or alternatively a screw or other fastener may be used to secure the retainer clip 26 in place.

Various embodiments of gate valve heaters may utilize a separate temperature controller or an internal temperature controller that provides the appropriate temperature after power is supplied to the heater. Depending on the type of control desired over the gate valve heater, a variety of switches, such as a thermostat switch 54, an "at" temperature switch 56, and an "over" temperature switch 58 may be present. The "at" switch controls the heater so that the appropriate temperature is achieved and maintained. The "over temperature" switch prevents the heater from significantly exceeding the appropriate temperature. If the "at" temperature is significantly exceeded, for example, by 10° C., the power is shut off and restarted after the gate valve surface has cooled by heat transfer to the adjacent ambient environment.

The switches of the illustrated embodiment have an accuracy of +/−5° C. In certain embodiments the preferred target or "at" temperature is 150° C. at the surface of the gate valve body. Such a temperature has been successfully utilized for an embodiment of a heater placed on a VAT Series 10 UHV Gate Valve, size DN200 (200 mm passage size), having a modified rib structure. Embodiments of the gate valve heater may also include one or more thermocouples or other temperature sensors, preferably attached to or in contact with one or more of the contact plates, heating elements, or the surface of the gate valve.

Another embodiment of a gate valve heating device, as mounted on a gate valve body 108, is shown in FIGS. 10–13. This embodiment is similar to the those shown in earlier figures and described above, and include similar upper and lower contact plates 136 and 138, upper and lower heating elements 140 and 142, as well as insulation 144. The gate valve body 108, like the gate valve body 8 of FIG. 2, has horizontal ribs 116, vertical ribs 120, and openings 121 in the vertical ribs 120. As explained below, certain differences in the embodiment shown in FIG. 10 relate to the shape of the retainer clip 126 and the shape of the outer shell 146.

Figure 10:
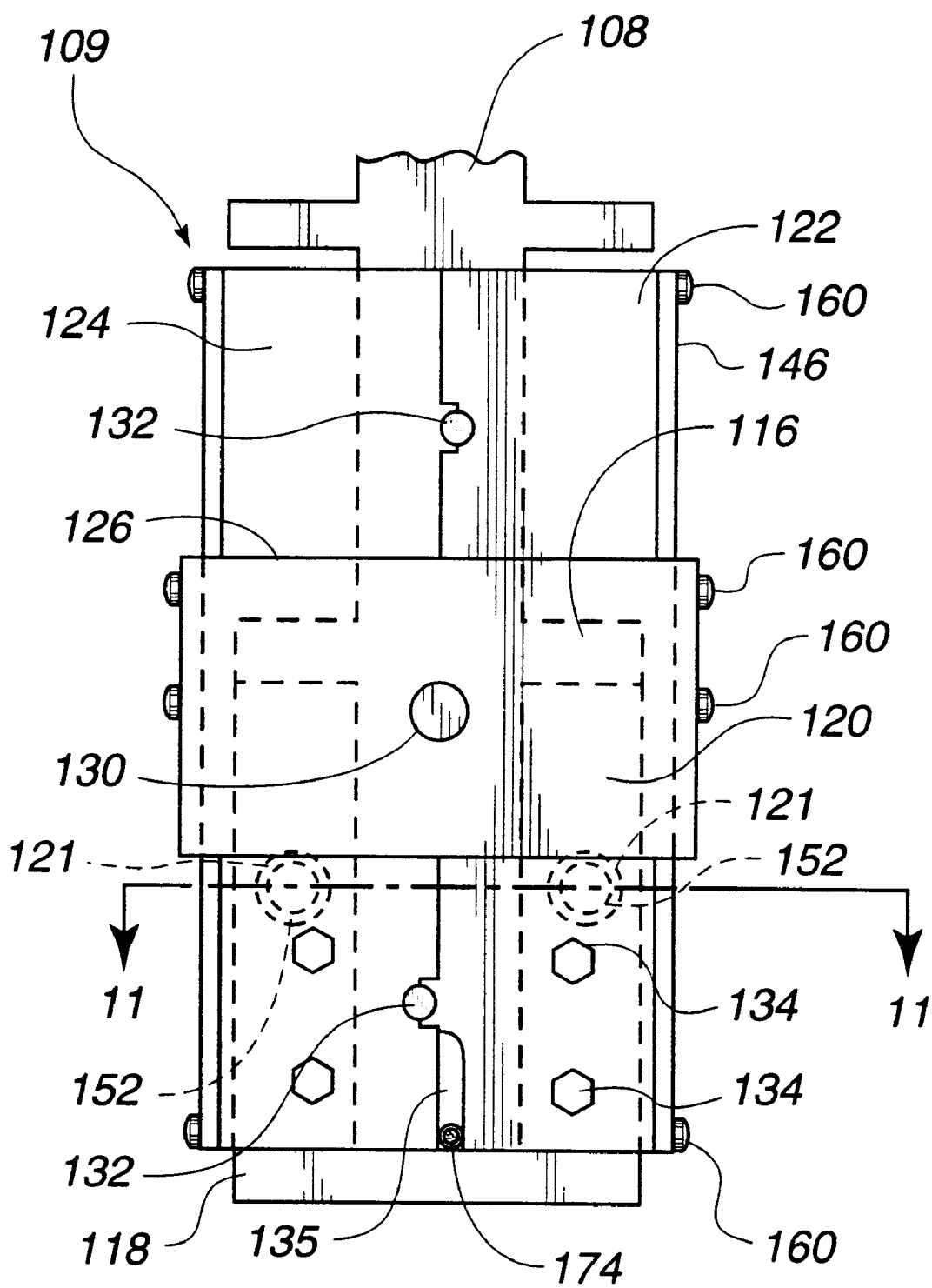
FIG. 10 is an end view of a gate valve heater according to another embodiment of the present invention.

The gate valve heater 109 of this embodiment also has two opposing sections 122 and 124 and a retainer clip 126 having a central handle 130 to apply pressure to the sections 122 and 124 to insure good contact with the gate valve. FIG. 10 shows input and output lines 134, for functions such as temperature output, and power line 174 disposed through the bottom central portion 135 of the front face of the gate valve heater. Alternatively the input and output lines 134 may also extend through the bottom central portion 135 of the gate valve heater. Nema style power connectors may be used for both main power and for connecting the heating elements 140 and 142 in each section 122 and 124 to one another. Bolts 160 that extend through the outer shell 146 are used to connect interior portions, including contact blocks 136 and 138, and heating elements 140 and 142, to the outer shell 146.

Figure 11:
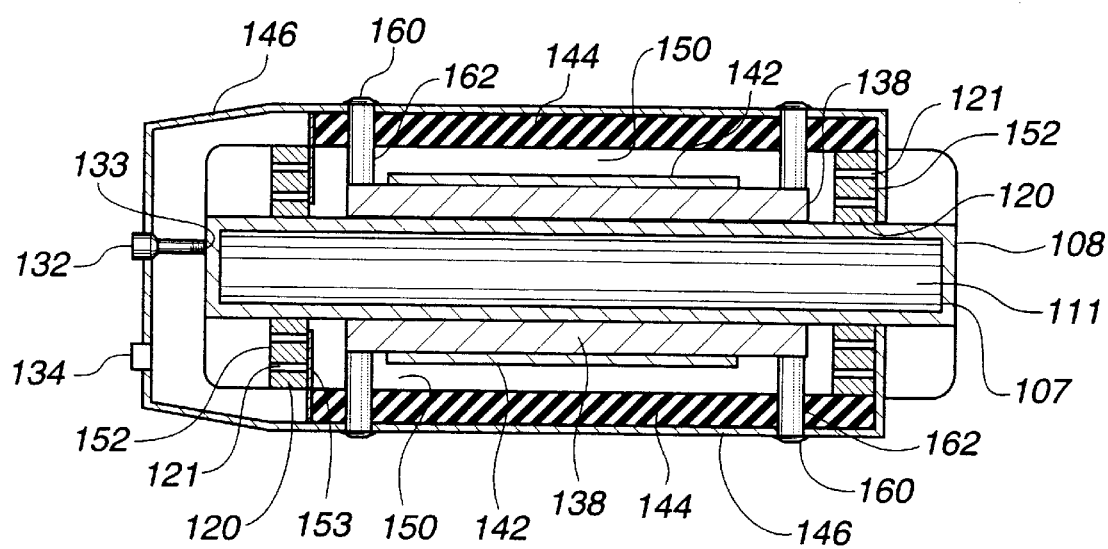
FIG. 11 is a cross-sectional view along the lines 11—11' of the embodiment of FIG. 10.

FIG. 11 shows a top cross-sectional view of the embodiment shown in FIG. 10 along the lines 11—11'. FIG. 11 also shows the exterior wall 107 of the gate valve body 108 (the structure of the interior portion 111 of the gate valve body 108 has been omitted for clarity). An outer shell 146 of the two sections may be tapered inward at one end in order to reduce the outer dimensions of the gate valve heater. As described earlier bushing spacers 162 space the outer shell from the contact plate 138. Between the insulation 144 and the lower heating element 142 lies a gap 150.

Figure 13:
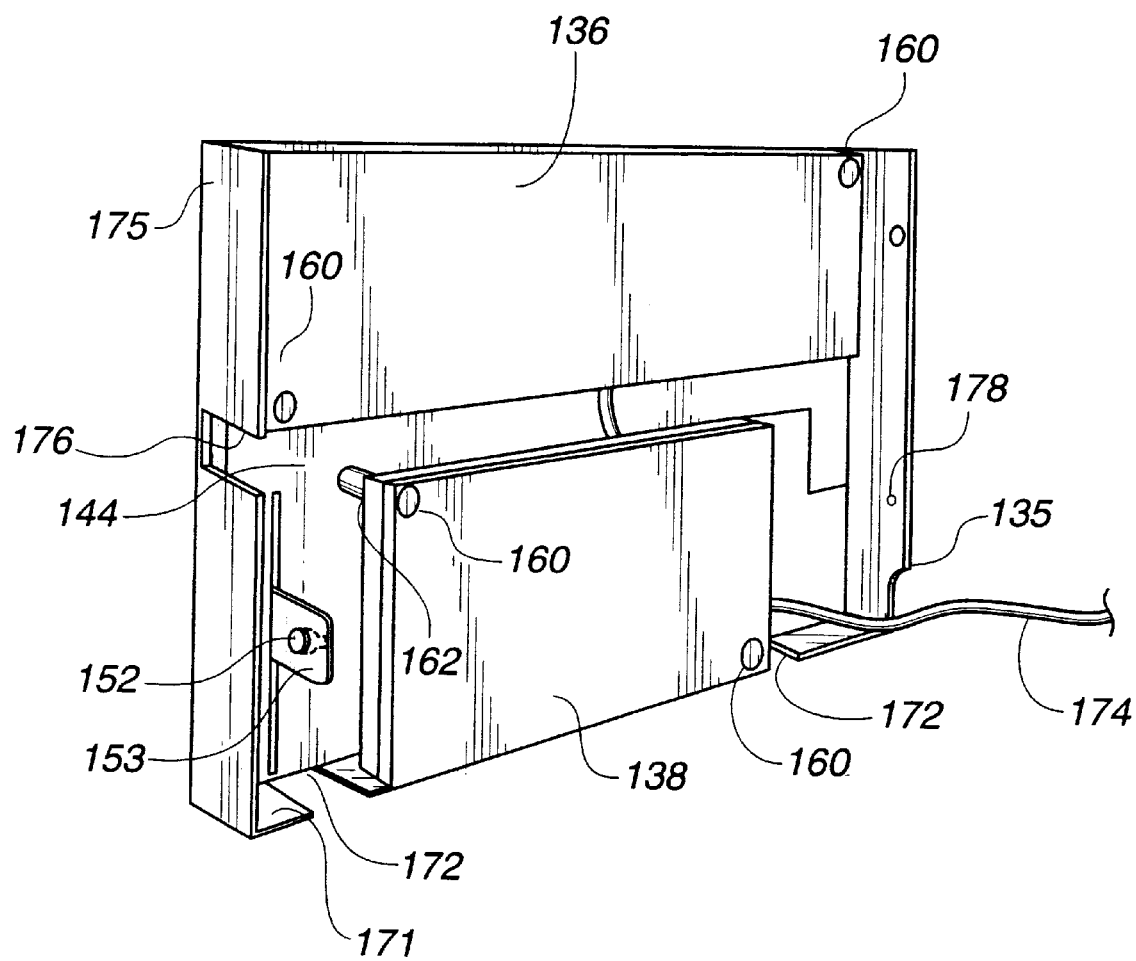
FIG. 13 is an interior view of a portion of the gate valve heater of FIG. 12.

As best seen in FIG. 13, support posts 152 are be attached to the shell 146 through support members 153. The support posts 152 are positioned to fit within an opening 121 (FIG. 11) located about midway in a vertical rib 120 on the gate valve. An adjustment screw 132 threaded into the outer shell 146 of the heater has one end 133 abutting the end wall 48 of the gate valve. After the support posts 152 have been aligned with the rib openings 121 and the two sections 122 and 124 have been clamped together by the retainer clip 126, the entire heater is translated horizontally with respect to the gate valve by rotating the screw 132. As a consequence, the support posts 152 are moved into the openings 121 in the vertical ribs 120 of the gate valve. This ensures that the gate valve heater is properly positioned on the gate valve.

Figure 12:
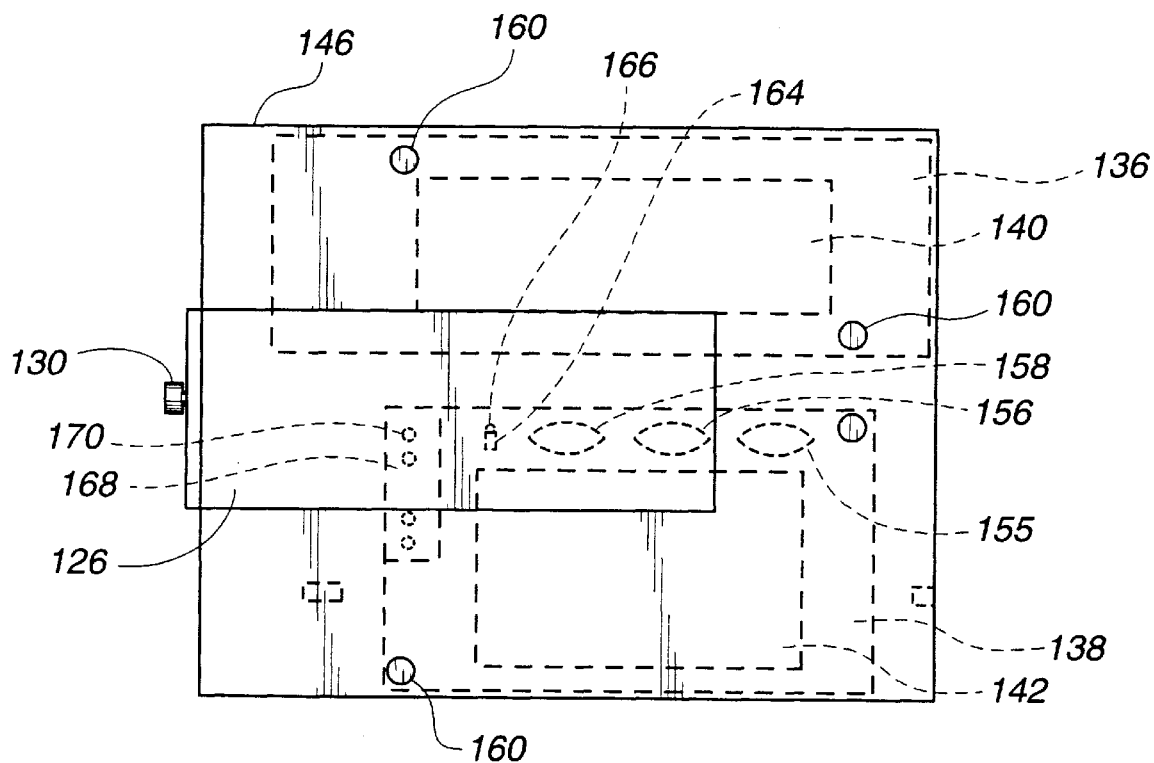
FIG. 12 is a side view of the gate valve heater of FIG. 11.

As shown in the side view of FIG. 12, the retainer clip 126 may have a centrally disposed handle 130, for example, a screw and nut attached to the retainer clip. The handle 130 may be used to fasten the retainer clip 126 to the gate valve heater.

The gate valve heater assembly is configured to have spaces in it which conform to any ribs or other projections extending from the surfaces of the gate valve over which the gate valve heater is attached. For example, as seen in FIG. 13, the outer shell 146 of each section has a bottom wall portion 171 that defines openings 172, and further has a side wall portion 175 which defines an opening 176. The openings 172 are positioned to receive vertical ribs of the gate valve and the opening 176 is positioned to receive a horizontal rib of the gate valve. As a consequence, the outer shells 146 of the two heater sections can have top, bottom and side wall portions to more fully enclose the heater yet accommodate the ribs of the gate valve. The bottom openings 172 are preferably sized to accommodate lateral movement between the heater and the gate valve as the adjustment screw 132 is rotated to seat the support posts 152 into the rib openings as described above.

A terminal block 168 (FIG. 12) and terminal connectors 170 may be disposed between the lower contact plate 138 and the shell 146. (See FIG. 12) Similarly situated between the lower contact plate 138 and the shell 146 may be a thermocouple 164 and thermocouple connector 166, as well as various connectors and switches for operation of the heater, for example, an "at" temperature switch 156, an "over" temperature switch 158, and a reset switch 155. These switches control the gate valve heater to achieve the proper temperature. Should the temperature become too high, the system will be cooled and reset. Preferred embodiments may also include an indicator light 178 (FIG. 13) to indicate proper functioning of the gate valve heater.

As best seen in FIG. 4, embodiments of the gate valve heater may be positioned at the lower portion of the body of the gate valve. Such placement of the gate valve heater leads to certain advantages and increased efficiencies in the system.

First, the positioning of the gate valve heating device and temperatures utilized are significant because heat traveling through the gate valve body to the cryo-pump can result in decreased cryo-pump efficiency. In order to minimize effects on the cryo-pump, the gate valve heater is preferably positioned on the lower body portion of the gate valve, which is spaced apart from the cryo-pump. The gate valve is also preferably insulated as discussed above to retard heat from traveling through the air and heating the cryo-pump.

Second, contaminants may settle near the bottom portion of the gate valve. By heating the lower portion of the gate valve body, these contaminants are driven up through the length of the gate valve and towards the vacuum pump. Areas of the gate valve disposed just above the location of the heater are believed to still receive adequate heat from the heater. However, because the heat will be greater in the portion of the gate valve directly contacted by the heater, the contaminants are driven up through the length of the gate valve as heated gases rise towards the opening to the vacuum pump, where the contaminants can be removed from the system.

In addition, the framed construction of embodiments of the gate valve heater is believed to be more durable than prior art flexible heating jackets, and less susceptible to particle flake off during repeated use.

In experimental tests, the use of the gate valve heater reduced the bake out time needed to achieve base pressure in a chamber having a volume of approximately $2.6 \times 10^4$ cm$^3$ by approximately 5 hours, using a CTI Cryogenics cryogenic vacuum pump, model 8F on board cryo-pump, and a VAT Series 10 gate valve, size DN200 (having a modified rib structure) that has a maximum passage area of approximately $3.1 \times 10^2$ cm$^2$. The parameters used in the heater were a hold temperature of 125° C., a hold time of 31 hours and a ramp rate of heating and cooling of 50° C./hour. Aspects such as the size and geometry of the chamber and gate valve, as well as the types of contaminants present in the system, will influence the optimal hold temperature and hold time.

A gate valve heater according to embodiments of the present invention may differ from those described above in that its specific configuration may vary, depending, for example, on the design of the gate valve body, such as, for example, whether the gate valve has strengthening ribs, the wall thickness of the gate valve, the interior geometry of the gate valve, etc. Likewise, the physical parameters of the gate valve body, its orientation with respect to the chamber, vacuum pump and accompanying hardware, will influence the exact design of the gate valve heater and its optimal positioning on the gate valve.

From the foregoing, it will be apparent that there is shown and described an apparatus and method for reducing the time necessary to achieve proper chamber conditions for semiconductor processing such as plasma vapor deposition for a system utilizing a gate valve separating a chamber and vacuum pump. Embodiments of the present invention can be applied to other types of semiconductor processing systems performing functions other than plasma vapor deposition such as, for example, chemical vapor deposition or other processes that require low pressures. Examples of commercial semiconductor systems using a gate valve for which embodiments of the present invention could be utilized include the ENDURA® line and CENTURA® line of semiconductor processing systems manufactured by Applied Materials Inc.

Finally, numerous variations of the described procedures may readily occur to those skilled in the art once they have been made familiar with the disclosure of the present invention.

What is claimed is:

1. A semiconductor processing system comprising
    a vacuum pump;
    a chamber;
    a gate valve disposed between said vacuum pump and said chamber, said gate valve comprising a passage housing portion including a passage between said chamber and said vacuum pump, and a slot housing portion including a slot extending away from said passage; and
    a gate valve heater coupled to said slot housing portion of said gate valve and spaced a distance away from said passage housing portion, wherein said gate valve heater comprises a plurality of heated plates, said heated plates being in contact with said slot housing portion of said gate valve.

2. A semiconductor processing system as in claim 1, further comprising a rigid outer shell surrounding said heated plates, said heated plates being disposed between said outer shell and said gate valve; and
    insulation disposed within said outer shell, with at least a portion of said insulation being disposed between said heated plates and said outer shell.

3. A semiconductor processing system as in claim 2, wherein said gate valve heater includes first and second heater sections, with each of said first and second heater sections including at least a portion of said outer shell and at least one heated plate.

4. A semiconductor processing system as in claim 3, further comprising a retainer for holding said first and second heater sections in place on said gate valve; said retainer comprising a substantially U-shaped body.

5. A semiconductor processing system as in claim 3, wherein said gate valve includes a body portion surface having a plurality of ribs extending out therefrom, at least two of said ribs each defining an opening therein; and said first and second gate valve heater sections each have at least one support post therein, and adapted to be received within one of said openings in said ribs.

6. A semiconductor processing system as in claim 3; wherein said gate valve includes a body portion surface having at least one rib extending out therefrom, and wherein at least a portion of at least one rib is disposed within said outer shell of said gate valve heater.

7. A semiconductor processing system as in claim 3, wherein said vacuum pump is a cryogenic vacuum pump.

8. A semiconductor processing system as in claim 1, wherein said slot in said slot housing portion intersects said passage extending between said chamber and said vacuum pump when said gate valve is in an open position.

9. A semiconductor processing system as in claim 1, wherein said passage housing portion is positioned above said slot housing portion.

10. A method of removing contaminants from a semiconductor processing system including a gate valve having a passage housing portion containing a passage aligned between a chamber and a vacuum pump, and a slot housing portion containing a slot extending away from said passage, the method comprising:

heating at least part of said slot housing portion to a higher temperature than said passage housing portion to remove contaminants from surfaces in said gate valve; and pumping contaminants from said gate valve.

11. The method of claim 10 wherein said heating said gate valve comprises heating at least part of said slot housing portion of said gate valve using a heating source external to said gate valve.

12. The method of claim 10, wherein said heating said slot housing portion comprises positioning a heater device over at least one rib structure extending outward from said slot housing portion and transmitting heat from said heater device to said slot housing portion.

13. The method of claim 12, said heater device including at least one heating plate and a cover, said method further comprising positioning said heater device so that said at least one heating plate is held against an outer surface of said slot housing portion adjacent to said rib structure and said cover is disposed over said heating plate and said rib structure.

14. The method of claim 13, wherein said slot housing portion of said gate valve includes 4 sides and said heater device is positioned to cover 3 of said 4 sides.

15. The method of claim 10, further comprising heating an outer surface of at least a portion of said slot housing portion to a temperature of about 125° C.

16. The method of 10, further comprising heating an outer surface of at least a portion of said slot housing portion to a temperature of about 150° C.

17. A method of removing contaminants from a semiconductor processing system comprising:

mounting an external heater to a gate valve disposed between a processing chamber and a vacuum pump, said gate valve including a first section containing a passage between said processing chamber and said vacuum pump, and a second section containing a slot extending away from said passage, wherein said mounting comprises positioning said external heater on said second section a distance away from said first section;

heating said gate valve to drive contaminants from surfaces in said gate valve; and pumping contaminants from said gate valve.

18. The method of claim 17 wherein said mounting comprises attaching a plurality of heater sections to said second section of said gate valve and coupling said heater sections together.

19. The method of claim 17 wherein said mounting comprises attaching two heater sections over said second section of said gate valve, each heater section including at least one flat contact plate, with one heater section on a first side of said second section of said gate valve and a second heater section on a second, opposite side of said second section of said gate valve, and compressing said heater sections towards one another so that said flat contact plates contact opposite sides of said second section of said gate valve.

20. The method of claim 17 wherein said heater comprises insulation disposed between said contact plate and a rigid shell.

21. The method of claim 17 wherein said heating comprises heating an outer surface of said second section of said gate valve to a temperature of approximately 150° C.

22. The method of claim 17 wherein said pumping comprises pumping with a cryogenic pump.

23. The method of claim 22 further comprising shielding said cryogenic vacuum pump from said heater.

24. The method of claim 17, wherein said heating said gate valve comprises heating said lower section of said gate valve to a higher temperature than said upper section of said gate valve.

25. The method of claim 17, wherein said heating said gate valve comprises creating a temperature distribution along a length of said gate valve, with said temperature decreasing along at least a portion of said length from said second section to said first section, said temperature being sufficient to drive contaminants from said second section towards said first section.

26. The method of claim 17, wherein said first section is disposed above said second section.

27. The method of claim 17, wherein said heater includes a heating plate and said heating comprises transmitting heat from said heating plate to said second section.

28. The method of claim 17, wherein said heating comprises positioning first and second heater plates against an outer surface of said second section and positioning said heater plates so that a rib structure extending outward from said outer surface fits between said heater plates.

29. The method of claim 28, wherein said heater includes at least one support post and positioning said support post in an opening in said rib structure.

30. The method of claim 17, further comprising heating said gate valve so that said second section of said gate valve is at a higher temperature than said first section of said gate valve.

31. The method of claim 17, wherein said first section is disposed above said second section.

32. The method of claim 17, wherein said first section is located above said second section.

33. A method for heating a gate valve having an upper region surrounding a passage between components and a lower region surrounding a slot extending away from said passage, said slot sized to accommodate plates that can be positioned to block said passage, said method comprising:

positioning first and second heating plates against a first surface of said gate valve so that a first rib extending outward from said first surface extends between said first and second heating plates;

positioning third and fourth heating plates against a second surface of said gate valve so that a second rib extending out from said second surface extends between said third and fourth heating plates;

heating said gate valve so that said lower region of said gate valve is at a higher temperature than said upper region of said gate valve.

34. A method for removing contaminants from a processing system comprising:

providing a vacuum pump, a processing chamber, and a gate valve, said gate valve including an upper passage therein disposed between said vacuum pump and said processing chamber, said gate valve also including a lower region spaced a distance away from said upper passage;

heating at least a portion of said gate valve so that the temperature decreases along at least a portion of the length of said gate valve above said lower region towards said passage;

pumping said contaminants through said passage to said vacuum pump.

35. The method of claim 34, further comprising heating said processing chamber, wherein said processing chamber and gate valve are heated at the same time.

36. The method of claim 35, comprising heating said processing chamber to a temperature of about 100° C. to about 200° C.

37. The method of claim 34, wherein said gate valve lower region includes an outer surface that is heated to a temperature of about 125° C.

38. The method of claim 34, wherein said gate valve lower region includes an outer surface that is heated to a temperature of about 150° C.

39. The method of claim 34, wherein said heating is carried out by positioning an external heater in contact with at least part of said lower region of said gate valve while leaving an upper region of said gate valve free from contact with said external heater, and applying energy to said external heater.

40. The method of claim 34, wherein said heating is carried out by positioning a plurality of plates against part of said lower region of said gate valve and heating said plates.

* * * * *